United States Patent
Zimmerman

(10) Patent No.: US 11,619,239 B2
(45) Date of Patent: Apr. 4, 2023

(54) TURBO CHARGER WITH COMPRESSOR WHEEL

(71) Applicant: Air-Tec Innovations, LLC, Cantril, IA (US)

(72) Inventor: Wayne M. Zimmerman, Cantril, IA (US)

(73) Assignee: AIR-TEC INNOVATIONS, LLC, Cantril, IA (US)

( * ) Notice: Subject to any disclaimer, the term of this patent is extended or adjusted under 35 U.S.C. 154(b) by 0 days.

(21) Appl. No.: 17/096,369

(22) Filed: Nov. 12, 2020

(65) Prior Publication Data

US 2022/0145766 A1  May 12, 2022

(51) Int. Cl.
*F04D 29/28* (2006.01)
*F04D 17/10* (2006.01)
*F04D 29/38* (2006.01)

(52) U.S. Cl.
CPC ........... *F04D 29/284* (2013.01); *F04D 17/10* (2013.01); *F04D 29/384* (2013.01)

(58) Field of Classification Search
CPC ....... F04D 29/284; F04D 29/384; F04D 17/10
See application file for complete search history.

(56) References Cited

U.S. PATENT DOCUMENTS

| | | | |
|---|---|---|---|
| 8,696,316 B2 * | 4/2014 | Decker | F04D 29/023 416/223 B |
| 8,997,486 B2 * | 4/2015 | Hall | B60W 20/16 60/605.1 |
| 9,897,107 B2 * | 2/2018 | An | F04D 29/284 |
| 2017/0276233 A1 * | 9/2017 | Nishioka | F16H 57/042 |
| 2017/0298951 A1 * | 10/2017 | Itoh | F04D 29/30 |
| 2018/0238339 A1 * | 8/2018 | Nickson | F04D 29/284 |
| 2019/0128127 A1 * | 5/2019 | Gannon | F01D 5/025 |
| 2020/0116153 A1 * | 4/2020 | Salenbien | F04D 29/043 |

OTHER PUBLICATIONS

BorgWarner Turbo Systems, BorgWarner EFR Turbocharger Technical Training Guide: TechTG-1110-B, Year 2010, p. 76-77.

* cited by examiner

*Primary Examiner* — Michael L Sehn
(74) *Attorney, Agent, or Firm* — Goodhue, Coleman & Owens, P.C.

(57) ABSTRACT

A compressor wheel for a turbocharger includes a body having a top and a bottom, the body formed from a material comprising titanium, a central hub extending from the top to the bottom of the body of the compressor wheel, a central axis extending longitudinally through a center of the central hub of the compressor wheel, a central opening extending through the central hub of the compressor wheel, and a first set of vanes mounted to the body relative to the central axis such that each of the first set of vanes is off-axis relative to the central axis. Each of the first set of vanes having a top portion proximate a top of the central hub and extending downwardly along a curved path to a bottom portion proximate a bottom of the body. The compressor wheel further includes a second set of vanes mounted to the body having a top portion proximate a midpoint of the body and extending downwardly along a curved path to a bottom portion proximate the bottom of the body. The bottom of the body of the compressor wheel has a bottom surface extending radially inwardly and upwardly such that less of the material is present than if the bottom surface was flat.

11 Claims, 9 Drawing Sheets

| RPM | Torque | Hp | Boost | BOOST 2 | Drive PS | EGT #2 | EGT #1 | PreCool | Aftcool | Load % |
|---|---|---|---|---|---|---|---|---|---|---|
| 1400 | 2807.2 | 761.6 | 36.90 | 38.41 | 32.29 | 1354 | 740 | 339.8 | 109.5 | 49.94 |
| 1450 | 2926.2 | 810.4 | 37.59 | 39.41 | 33.06 | 1367 | 731 | 333.3 | 107.9 | 52.85 |
| 1500 | 2987.6 | 861.4 | 37.51 | 39.25 | 36.67 | 1380 | 716 | 323.4 | 105.9 | 59.21 |
| 1550 | 3002.2 | 868.3 | 37.61 | 39.43 | 37.41 | 1380 | 716 | 323.0 | 105.8 | 59.98 |
| 1600 | 2863.8 | 871.3 | 35.47 | 37.33 | 38.80 | 1413 | 656 | 288.0 | 99.74 | 56.18 |
| 1650 | 2868.9 | 880.0 | 35.27 | 37.1 | 38.74 | 1415 | 654 | 286.5 | 99.53 | 26.72 |
| 1700 | 2769.5 | 881.0 | 34.34 | 36.18 | 41.44 | 1423 | 634 | 276.1 | 98.11 | 60.55 |
| 1750 | 2661.0 | 874.9 | 32.65 | 34.54 | 41.86 | 1475 | 556 | 238.5 | 94.08 | 58.65 |
| 1800 | 2643.0 | 917.0 | 30.77 | 32.68 | 45.06 | 1495 | 471 | 202.5 | 91.36 | 59.97 |
| 1850 | 2639.9 | 918.8 | 30.68 | 32.59 | 45.32 | 1493 | 467 | 200.7 | 91.25 | 60.09 |
| 1900 | 2599.1 | 925.9 | 29.74 | 31.67 | 46.41 | 1447 | 428 | 185.7 | 90.45 | 59.91 |
| 1950 | 2551.8 | 924.5 | 28.81 | 30.72 | 47.33 | 1370 | 402 | 175.9 | 90.01 | 60.05 |

FIG. 10A

| RPM | Torque | Hp | Boost | BOOST 2 | Drive PS | EGT #2 | EGT #1 | PreCool | Aftcool | Load % |
|---|---|---|---|---|---|---|---|---|---|---|
| 1400 | 3225.6 | 872.6 | 41.81 | 43.63 | 34.36 | 1318 | 787 | 342.4 | 115.0 | 56.30 |
| 1450 | 3195.6 | 878.4 | 41.22 | 42.89 | 35.29 | 1318 | 786 | 341.5 | 114.7 | 58.42 |
| 1500 | 3030.3 | 878.2 | 40.36 | 42.13 | 39.37 | 1348 | 765 | 324.0 | 109.8 | 55.97 |
| 1550 | 3028.4 | 876.5 | 40.41 | 42.17 | 39.22 | 1347 | 766 | 324.5 | 110.0 | 55.69 |
| 1600 | 2968.6 | 880.2 | 39.41 | 41.22 | 41.07 | 1361 | 750 | 312.4 | 107.1 | 56.36 |
| 1650 | 2879.7 | 896.1 | 37.13 | 38.98 | 42.43 | 1405 | 706 | 284.8 | 101.7 | 56.89 |
| 1700 | 2831 | 901.5 | 36.28 | 38.18 | 43.8 | 1430 | 677 | 269.2 | 99.30 | 57.97 |
| 1750 | 2742.4 | 890.9 | 35.63 | 37.56 | 45.07 | 1447 | 6549 | 260.0 | 98.00 | 58.82 |
| 1800 | 2721.2 | 942.2 | 34.4 | 36.5 | 51.39 | 1544 | 551 | 214.3 | 93.00 | 58.63 |
| 1850 | 2725.8 | 944.4 | 34.4 | 36.5 | 51.47 | 1545 | 550 | 213.6 | 92.94 | 58.55 |
| 1900 | 2702.5 | 961.8 | 33.29 | 35.37 | 53.31 | 1514 | 509 | 198.9 | 91.69 | 59.39 |
| 1950 | 2624.3 | 951.3 | 32.26 | 34.42 | 53.46 | 1473 | 482 | 189.5 | 90.97 | 59.91 |

FIG. 10B

TURBO CHARGER WITH COMPRESSOR WHEEL

FIELD OF THE INVENTION

The present invention relates to turbochargers. More particularly, but not exclusively, the present invention relates to an improved compressor wheel for turbochargers.

BACKGROUND

Turbochargers or turbos are used on engine to boost an engine's horsepower without significantly increasing its weight. Generally, exhaust flow from an engine is used to spin a turbine which then spins an air pump. Thus, turbochargers allow an engine to consumer more air and fuel.

Much of the focus on turbochargers is to improve peak performance such as to provide the biggest boost to horsepower when operating at the highest rotations per minute (RPM). However, in some applications such as for turbochargers used in semis and work trucks, drivability is more important than peak performance. For example, the use of turbochargers may create undesired surges in power making driving more difficulty especially where hills, mountains, or turns are involved. Moreover, increased horsepower may only be apparent at or near the top end RPM of the engine as opposed to throughout the full range of RPM for the engine.

A further problem with turbochargers relates to the longevity. Where turbochargers are used for semis and work trucks longevity can be an issue due to problems such as metal fatigue which may not be present in other applications of turbochargers.

Therefore, what is needed is a new and improved turbocharger.

SUMMARY

Therefore, it is a primary object, feature, or advantage of the present invention to improve over the state of the art.

It is a further object, feature, or advantage of the present invention to provide an improved turbocharger.

It is a still further object, feature, or advantage of the present invention to provide an improved turbocharger suitable for work trucks and semis.

Another object, feature, or advantage is to provide an improved turbochargers which enhances the drivability of a work truck or semi using the turbocharger.

Yet another object, feature, or advantage is to provide an improve turbocharger which provides improved performance over a wide range of engine RPM and not just the top of the RPM range for the engine.

A further object, feature, or advantage is to provide a turbocharger with improved durability and longevity.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a compressor wheel for a turbocharger includes a body having a top and a bottom, the body formed from a material comprising titanium, a central hub extending from the top to the bottom of the body of the compressor wheel, a central axis extending longitudinally through a center of the central hub of the compressor wheel, a central opening extending through the central hub of the compressor wheel, and a first set of vanes mounted to the body relative to the central axis such that each of the first set of vanes is off-axis relative to the central axis. Each of the first set of vanes having a top portion proximate a top of the central hub and extending downwardly along a curved path to a bottom portion proximate a bottom of the body. The compressor wheel further includes a second set of vanes mounted to the body having a top portion proximate a midpoint of the body and extending downwardly along a curved path to a bottom portion proximate the bottom of the body. The bottom of the body of the compressor wheel has a bottom surface extending radially inwardly and upwardly such that less of the material is present than if the bottom surface was flat. The plurality of blades are preferably sized and shaped so as to assist in maintaining power both at a bottom portion of a range of revolutions per minute (RPM) for an engine using the turbocharger and at a top portion of the range of the RPM for the engine using the turbocharger. The material may consist of titanium or a titanium alloy.

According to another aspect, a turbocharger includes a compressor housing and a compressor wheel positioned at the compressor housing, the compressor wheel includes a body having a top and a bottom, the body formed from a material, a central hub extending from the top to the bottom of the body of the compressor wheel, a central axis extending longitudinally through a center of the central hub of the compressor wheel, a central opening extending through the central hub of the compressor wheel, and a first set of vanes mounted to the body relative to the central axis such that each of the first set of vanes is off-axis relative to the central axis. Each of the first set of vanes has a top portion proximate a top of the central hub and extending downwardly along a curved path to a bottom portion proximate a bottom of the body. There is a second set of vanes mounted to the body having a top portion proximate a midpoint of the body and extending downwardly along a curved path to a bottom portion proximate the bottom of the body. The bottom of the body of the compressor wheel has a bottom surface extending radially inwardly and upwardly such that less of the material is present than if the bottom surface was flat. The turbocharger may further include a turbine housing, a turbine shaft assembly, a thrust bearing, the thrust bearing shaped to be generally circular and truncated at a chord. The material may comprise titanium and may consist of a titanium alloy. The plurality of blades may be sized and shaped so as to assist in maintaining power both at a bottom portion of a range of revolutions per minute (RPM) for an engine using the turbocharger and at a top portion of the range of the RPM for the engine using the turbocharger.

BRIEF DESCRIPTION OF THE DRAWINGS

Illustrated embodiments of the disclosure are described in detail below with reference to the attached drawing figures, which are incorporated by reference herein.

FIG. 8 is the prior art compressor wheel design of FIG. 4. FIG. 9 is the compressor wheel of FIG. 5.

FIG. 10A and FIG. 10B illustrate results of testing for both the prior art compressor wheel design of FIG. 4 and FIG. 8 (shown in FIG. 10A) and the compressor wheel of FIG. 5 and FIG. 9 (shown in FIG. 10B).

DETAILED DESCRIPTION

Figure 1:
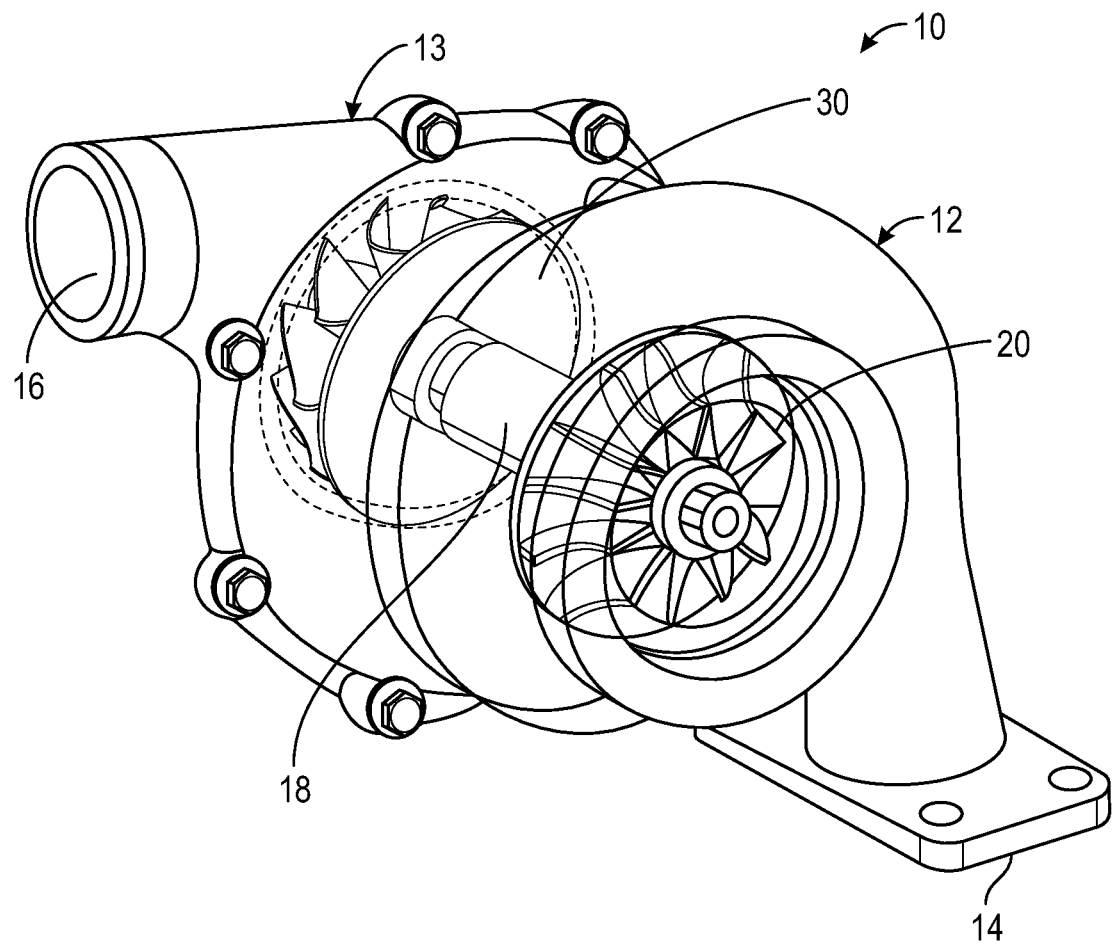
FIG. 1 illustrates a turbocharger.

FIG. 1 illustrates one example of a turbocharger 10. The turbocharger 10 has a turbine housing 12 and a compressor housing 13. An exhaust inlet 14 is shown where exhaust air from an engine is received. The exhaust air travels upwardly to a turbine wheel 20. The exhaust air turns the turbine wheel 20 which turns the shaft within the center hub rotating assembly 18 which turns a compressor wheel 30 which in turn outputs air to the engine from the air outlet 16 of the compressor housing.

Figure 2:
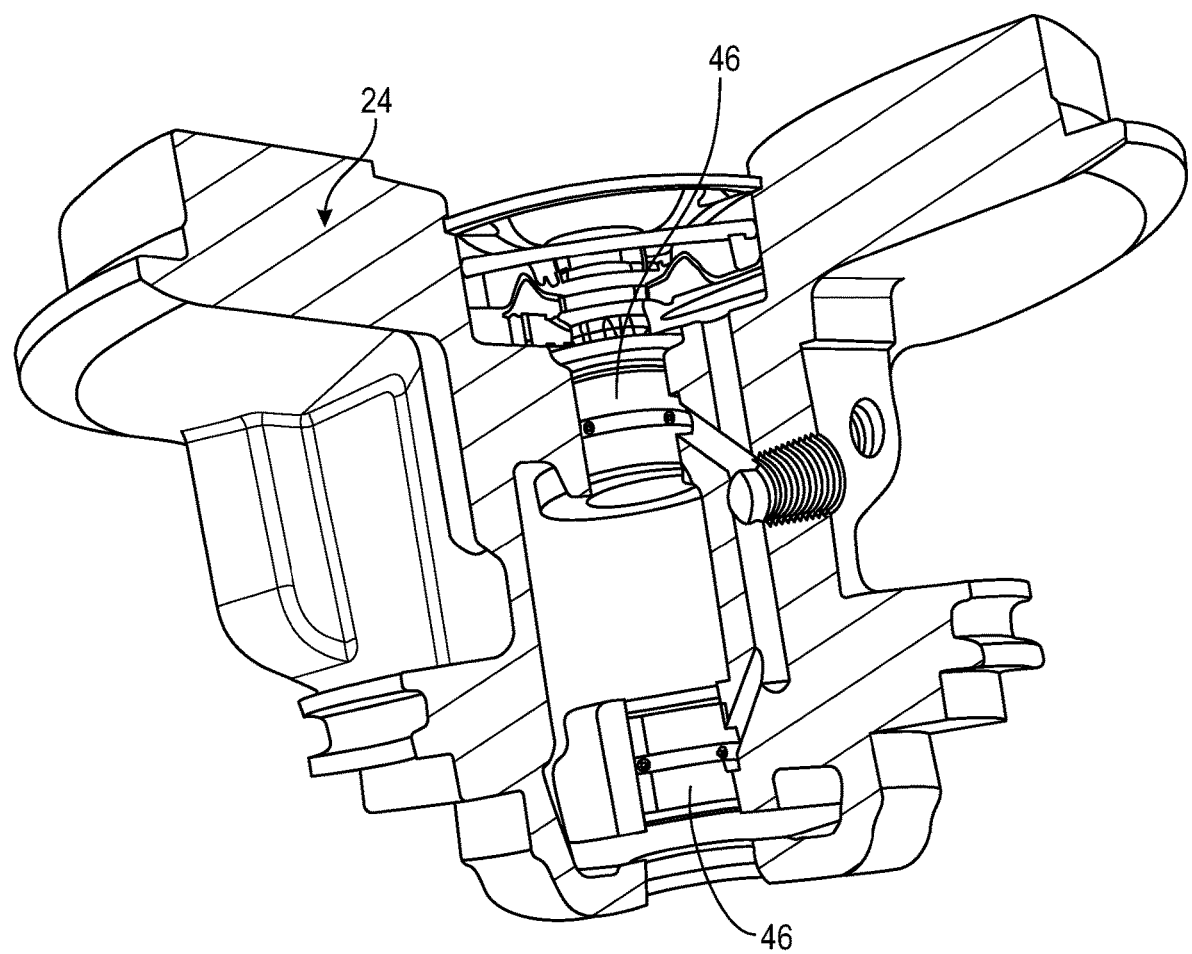
FIG. 2 illustrates a bearing housing of the turbocharger with a section removed.

FIG. 2 illustrates a view of a bearing housing 24 with a section removed. The bearing housing 24 is connected to the compressor housing and the turbine housing and supports rotor components. Journal bearings 46 are shown positioned within the bearing housing 24.

Figure 3A:
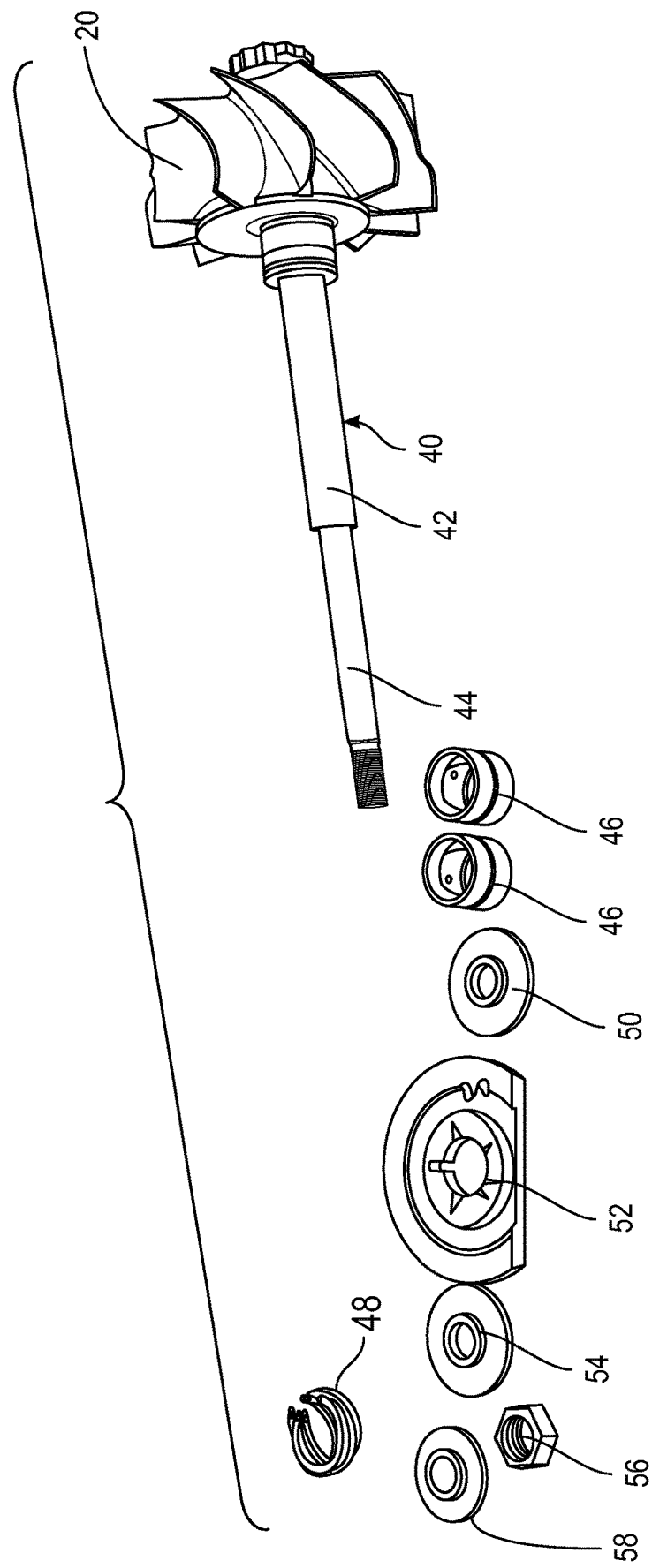
FIGS. 3A and 3B illustrate various components of the turbocharger.

FIG. 3A illustrates various components including the turbine 20 positioned on a turbine shaft assembly 40. The turbine shaft assembly has a first shaft portion 42 proximate the turbine 20 which has a greater diameter than a second shaft portion 44 which is positioned on the opposite side of the first shaft portion 42, further away from the turbine 20. The turbine shaft assembly 40 may have greater thicknesses or diameters than conventional turbine shafts. The turbine shaft may have a larger diameter than conventional shafts and larger bearings than conventionally used.

Journal bearings 46 are shown as well as snap rings or retaining rings 48, rings 50, 54, 58, sleeve 56, and a thrust bearing 52. The thrust bearing 52 is configured to be generally circular but truncated at a chord extending across the circular at a position under the center.

Figure 3B:
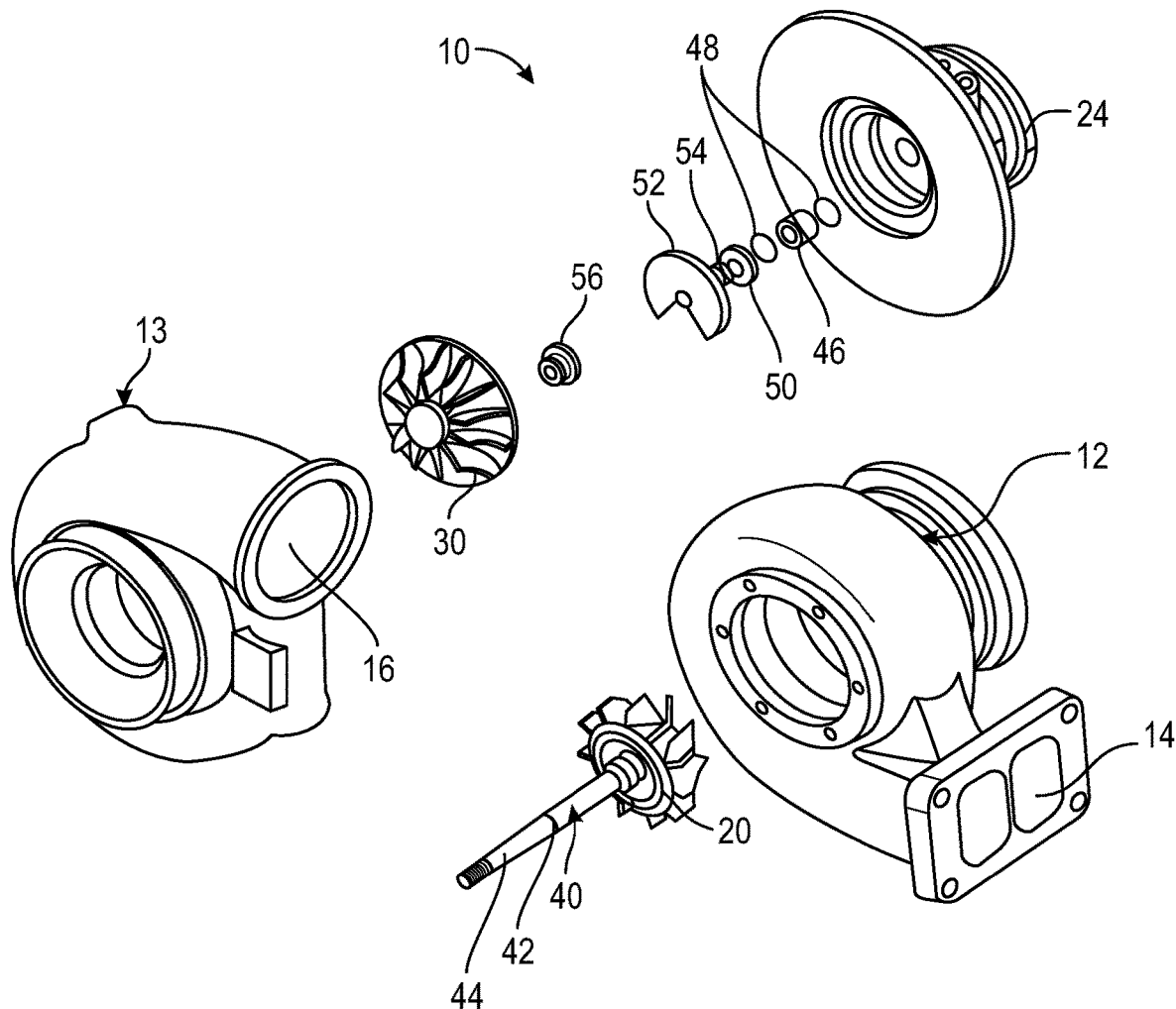

FIG. 3B is another view showing various components of the turbine 20 including the turbine housing 12 with the exhaust inlet 14, the compressor housing 13 with the air outlet 16. The bearing housing 24 is shown which is positioned between the turbine housing 12 and the compressor housing 13.

Figure 4:
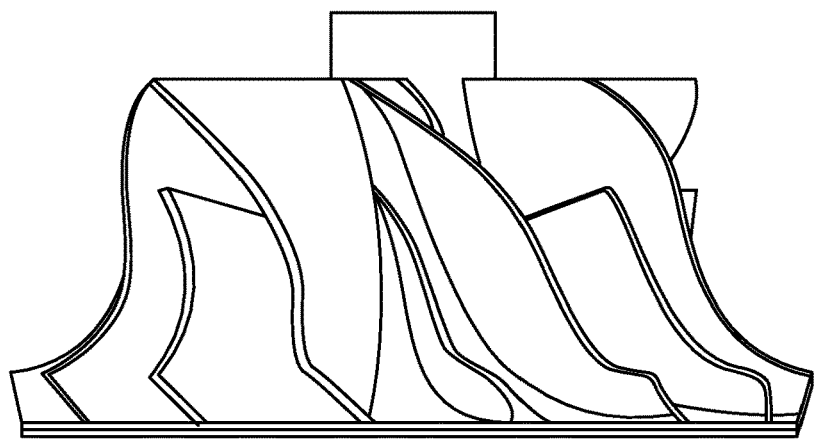
FIG. 4 is a prior art compressor wheel design available from BorgWarner.
Figure 5:
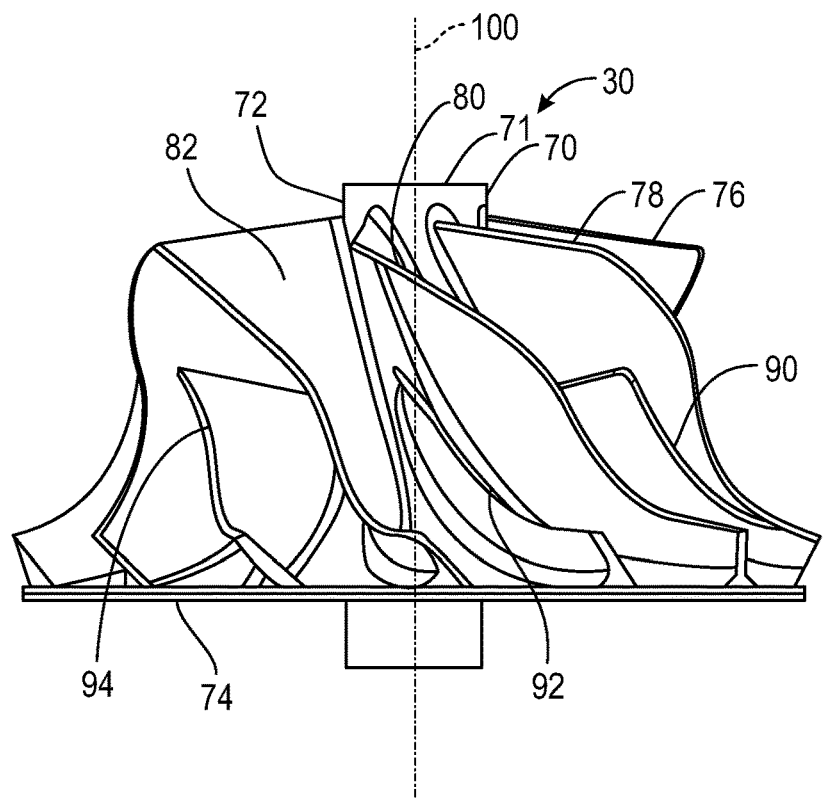
FIG. 5 is a compressor wheel of the turbocharger.

FIG. 4 and FIG. 5 are presented side-by-side for comparison purposes in order to assist in explanation of the present invention. FIG. 4 is a prior art compressor wheel design available from BorgWarner. FIG. 5 is a compressor wheel 30 for a turbocharger.

The compressor wheel of the present invention is formed from titanium or a titanium alloy. The blades or vanes of the compressor wheel are of unique design in order to affect air flow so that increased horsepower is provided in a way that provides for enhanced drivability of the associated vehicle.

The compressor wheel 30 has a body 70 having a top 72 and a bottom 74, the body 70 formed from a material comprising titanium. A central hub extends from the top the bottom of the body of the compressor wheel. A central axis 100 extending longitudinally through a center of the central hub of the compressor wheel 30. There is a central opening extending through the central hub of the compressor wheel. There is a first set of blades or vanes mounted to the body relative to the central axis such that each of the first set of blades or vanes are off-axis relative to the central axis.

Each of the first set of vanes has a top portion proximate a top of the central hub and extending downwardly along a curved path to a bottom portion proximate a bottom of the body. There is also a second set of vanes mounted to the body having a top portion proximate a midpoint of the body and extending downwardly along a curved path to a bottom portion proximate the bottom of the body.

Figure 6:
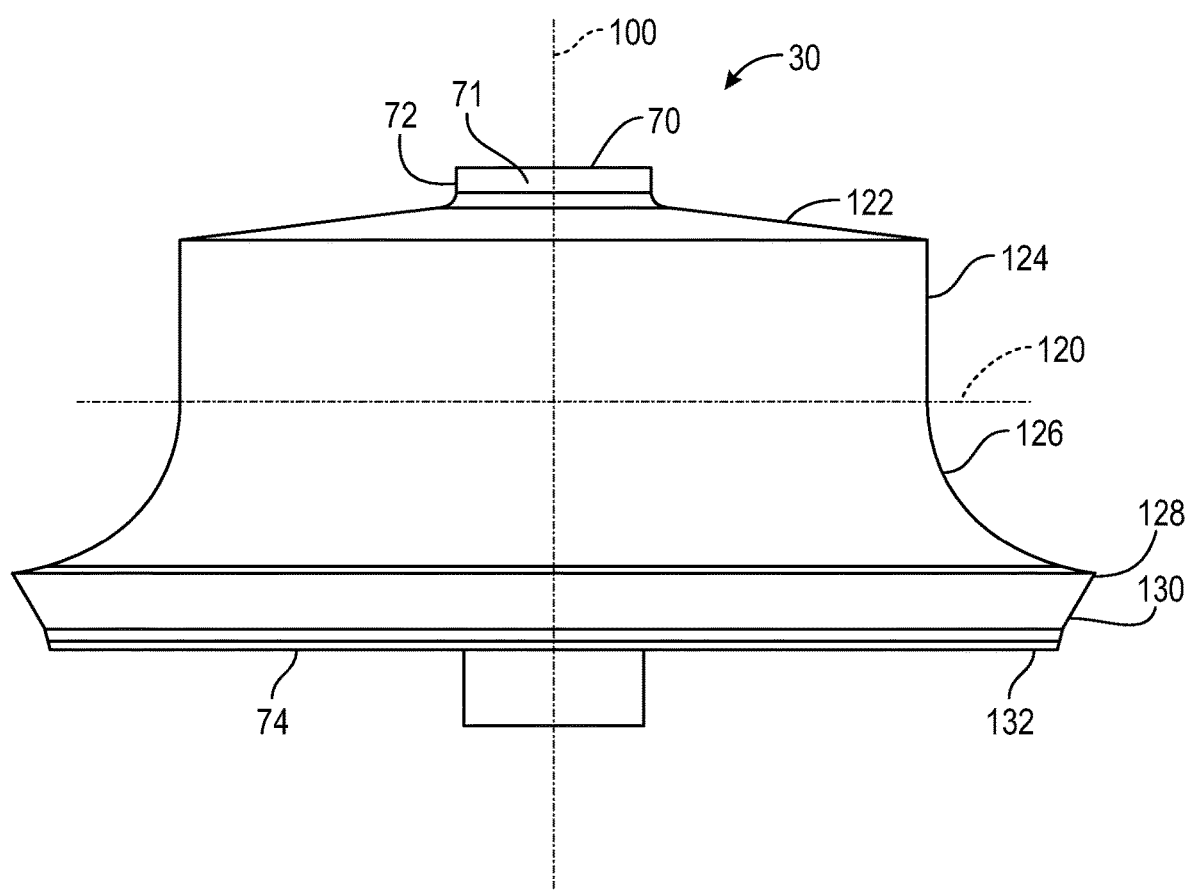
FIG. 6 further illustrates the body of the compressor wheel.

FIG. 6 illustrates the body 70 of the compressor wheel 30 showing the general shape of the compressor wheel 30. There is a top surface 122 which slopes downwardly from the central hub 71 at an angle to a middle portion 124 which extends vertically downwardly. A central axis 120 is shown which extends through a central portion. A lower portion 126 continues downwardly and outwardly along a curve to terminate at a point 128. The body then slopes downwardly and inwardly to form a portion 130 from 128 to a bottom portion 132.

Figure 7:
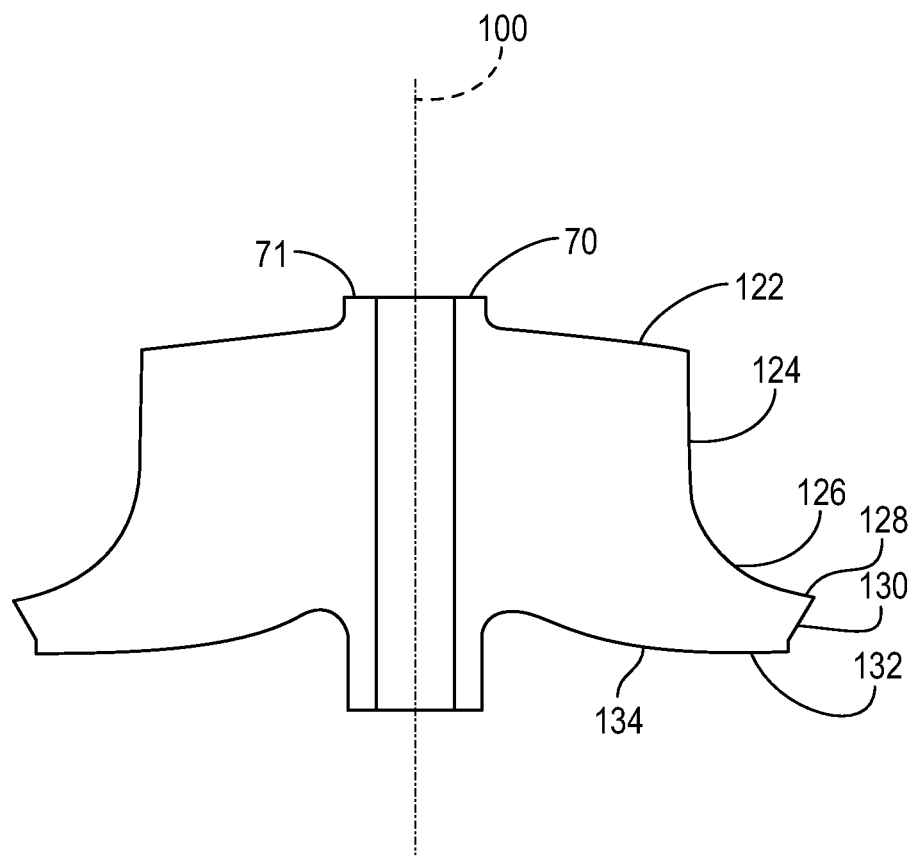
FIG. 7 illustrates a cross section of the body of the compressor wheel.

FIG. 7 illustrates a cross section of the body 70 of the compressor wheel 30. The bottom of the body 70 of the compressor wheel 30 has a bottom surface 134 extending radially inwardly and upwardly such that less of the material is present than if the bottom surface was flat.

Figure 8:
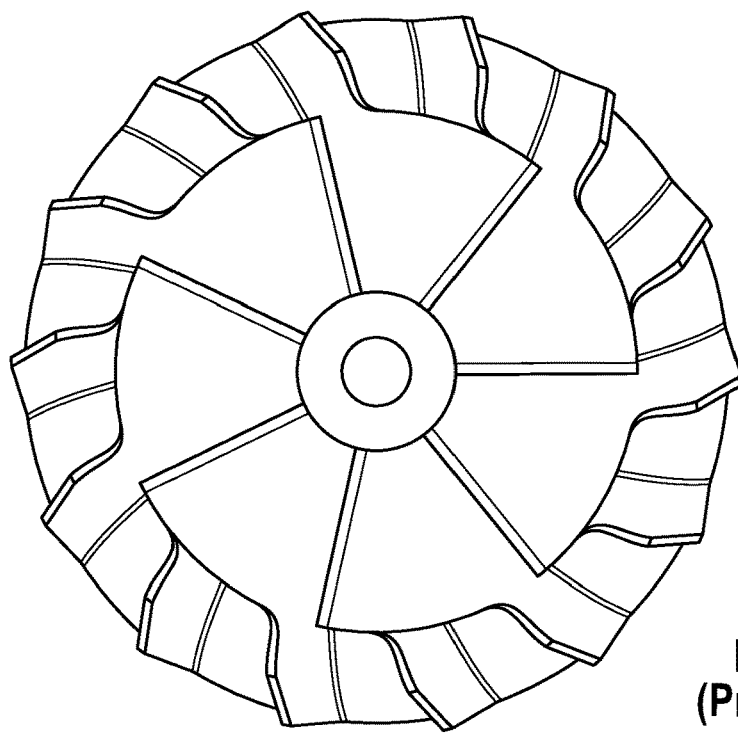
FIG. 8 and FIG. 9 are presented side-by-side for comparison purposes in order to assist explanation.
Figure 9:
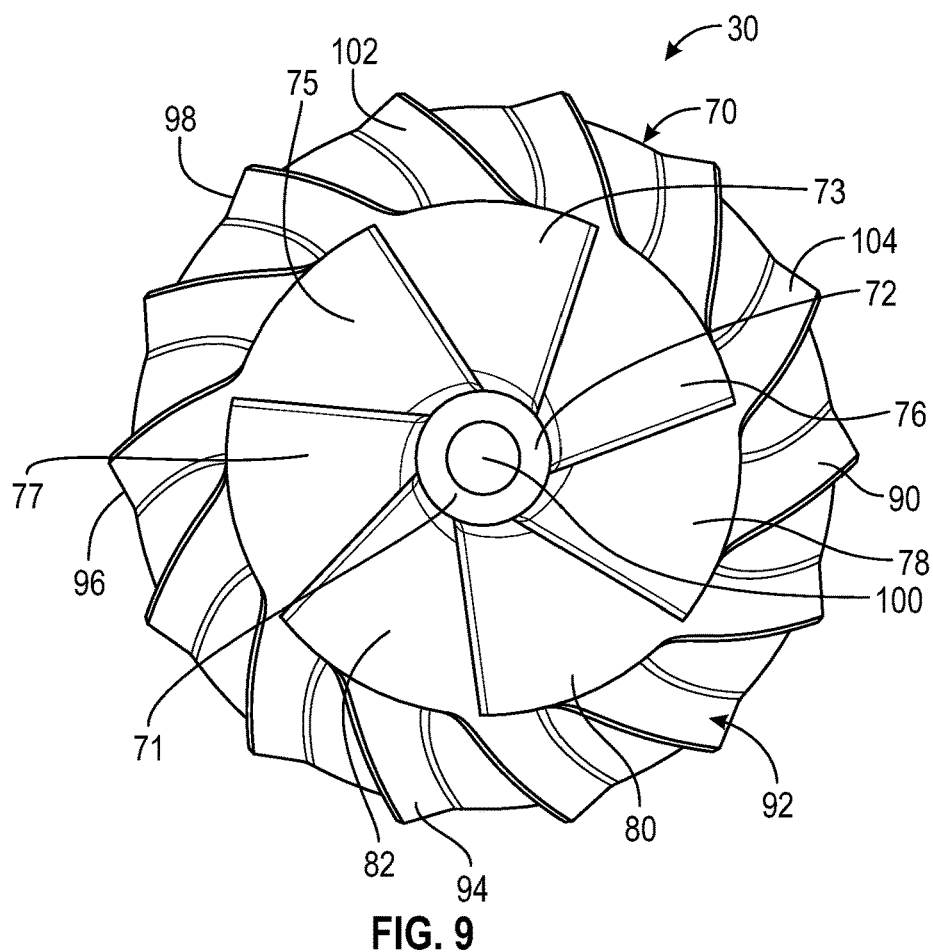

FIG. 8 and FIG. 9 are presented side-by-side for comparison purposes in order to assist explanation. FIG. 8 is the prior art compressor wheel design of FIG. 4. FIG. 9 is the compressor wheel 30. In this top view of FIG. 9, there is a first set of blades or vanes which includes blades or vanes 73, 75, 77, 82, 80, 78, 76. Each of these blades or vanes are mounted to the body relative to the central axis such that each of the first set of blades or vanes are off-axis relative to the central axis 100. There is also a second set of blades or vanes mounted to the body which includes blades or vanes 90, 92, 94, 96, 98, 102, 104.

FIG. 10A and FIG. 10B illustrate results of testing for both the prior art compressor wheel design of FIG. 4 and FIG. 8 (shown in FIG. 10A) and the compressor wheel 30 of FIG. 5 and FIG. 9 (shown in FIG. 10B). Engine rotates per minute (RPM) are shown as well as the torque and horsepower. The amount of boost provided by the turbocharger is shown, with the boost being measured with two alternative sensing systems. The drive PS (Pferdestärke or horse strength) is shown. The engine temperature as measured at two different points is shown. The precool, aftercool, and load percentages are also shown. Generally, the boost provided using the turbocharger with the compressor wheel design shown in FIG. 5 and FIG. 9 is greater than the boost provided by the prior art compressor wheel. The horsepower provided by the engine using the turbocharger with the compressor wheel design of the present application is also generally greater with less variability between the high end HP at 1950 RPM and the low end HP at 1400 RPM.

Therefore, an improved turbocharger and compressor wheel for a turbocharger has been shown and described. The invention is not to be limited to the particular embodiments described herein. In particular, the invention contemplates numerous variations in sizes, shapes, dimensions, materials, and other variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. A compressor wheel for a turbocharger, the compressor wheel comprising:
   a body having a top and a bottom, the body formed from a material comprising titanium;
   a central hub extending from the top to the bottom of the body of the compressor wheel;
   a central axis extending longitudinally through a center of the central hub of the compressor wheel;
   a central opening extending through the central hub of the compressor wheel;
   a first set of vanes mounted to the body relative to the central axis such that each vane of the first set of vanes has a top portion which smoothly extends outwardly and downwardly and the top portion is in a plane off-axis relative to the central axis;
   each vane of the first set of vanes extending downwardly along a curved path from the top portion to a bottom portion proximate a bottom of the body;
   a second set of vanes mounted to the body having a top portion proximate a midpoint of the body and extending downwardly along a curved path to a bottom portion proximate the bottom of the body;
   the bottom of the body of the compressor wheel having a bottom surface extending radially inwardly while extending upwardly along an entire circumference of the bottom of the body of the compressor wheel such that less of the material is present than if the bottom surface were flat;
   an outer surface of the bottom of the central hub extending vertically upwardly, beginning at a position below the bottom surface of the compressor wheel, and extending vertically upward and then outward to connect with the bottom surface of the bottom of the body of the compressor wheel.

2. The compressor wheel of claim 1 wherein the vanes of the first set of vanes and the vanes of the second set of vanes are sized and shaped so as to assist in maintaining power both at a bottom portion of a range of revolutions per minute (RPM) for an engine using the turbocharger and at a top portion of the range of the RPM for the engine using the turbocharger.

3. The compressor wheel of claim 1 wherein the material consists of a titanium alloy.

4. The compressor wheel of claim 1 wherein the material consists of titanium.

5. A turbocharger comprising:
   a compressor housing;
   a compressor wheel disposed at the compressor housing, the compressor wheel comprising:
   a body having a top and a bottom, the body formed from a material;
   a central hub extending from the top to the bottom of the body of the compressor wheel;
   a central axis extending longitudinally through a center of the central hub of the compressor wheel;
   a central opening extending through the central hub of the compressor wheel;
   a first set of vanes mounted to the body relative to the central axis such that a top portion of each vane of the first set of vanes smoothly slopes downwardly and outwardly and the top portion is in a plane which is off-axis relative to the central axis;
   each vane of the first set of vanes having the top portion proximate a top of the central hub and extending downwardly along a curved path to a bottom portion proximate a bottom of the body;
   a second set of vanes mounted to the body having a top portion proximate a midpoint of the body and extending downwardly along a curved path to a bottom portion proximate the bottom of the body; and
   the bottom of the body of the compressor wheel having a bottom surface extending radially inwardly while upwardly along an entire circumference of the bottom of the body of the compressor wheel such that less of the material is present than if the bottom surface were flat;
   an outer surface of the bottom of the central hub extending vertically upwardly, beginning at a position below the bottom surface of the compressor wheel, and extending vertically upward and then outward to connect with the bottom surface of the bottom of the body of the compressor wheel.

6. The turbocharger of claim 5 further comprising a turbine housing.

7. The turbocharger of claim 6 further comprising a turbine shaft assembly.

8. The turbocharger of claim 7 further comprising a thrust bearing, the thrust bearing shaped to be generally circular and truncated at a chord.

9. The turbocharger of claim 5 wherein the material comprises titanium.

10. The turbocharger of claim 5 wherein the material consists of a titanium alloy.

11. The turbo charger of claim 5 wherein the vanes of the first set of vanes and the vanes of the second set of vanes are sized and shaped so as to assist in maintaining power both at a bottom portion of a range of revolutions per minute (RPM) for an engine using the turbocharger and at a top portion of the range of the RPM for the engine using the turbocharger.

* * * * *